Sept. 10, 1929.  A. N. VAN NOSTRAND  1,728,022
TELAUTOGRAPH SYSTEM
Filed Sept. 29, 1928  2 Sheets-Sheet 1
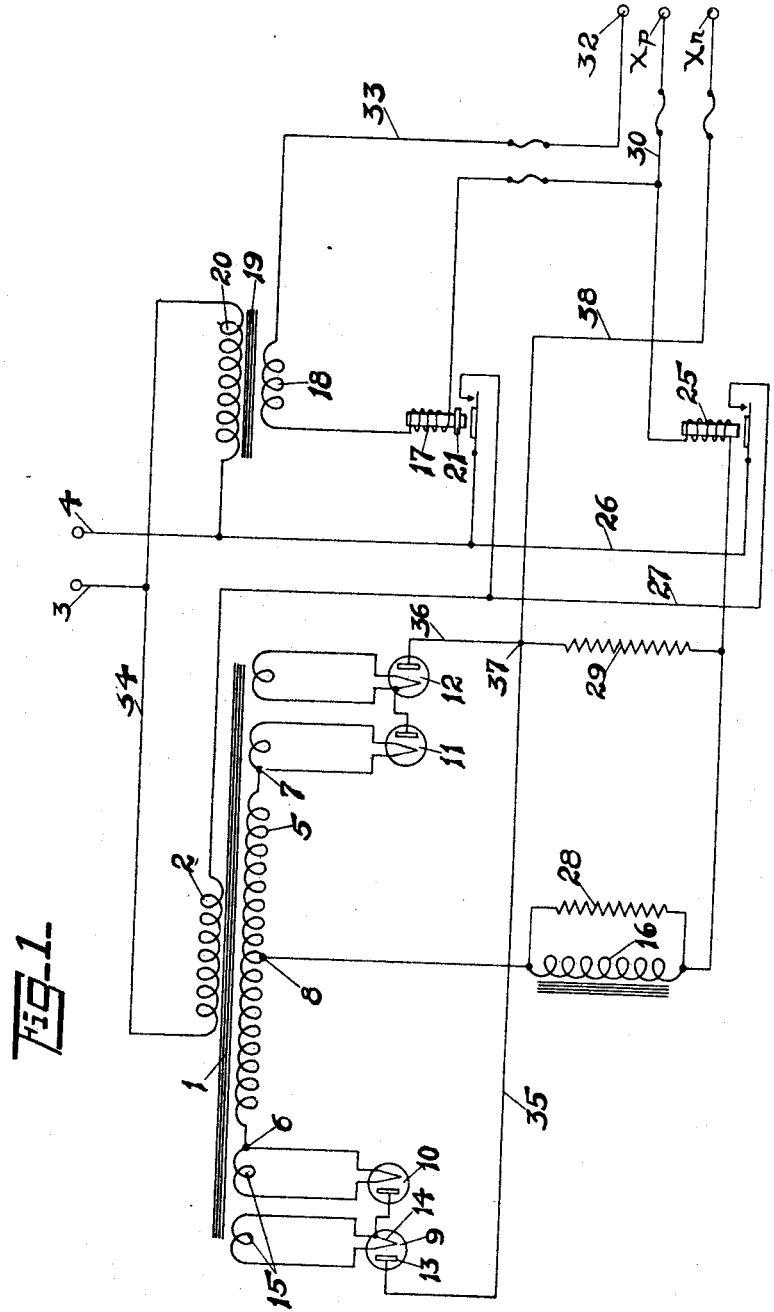

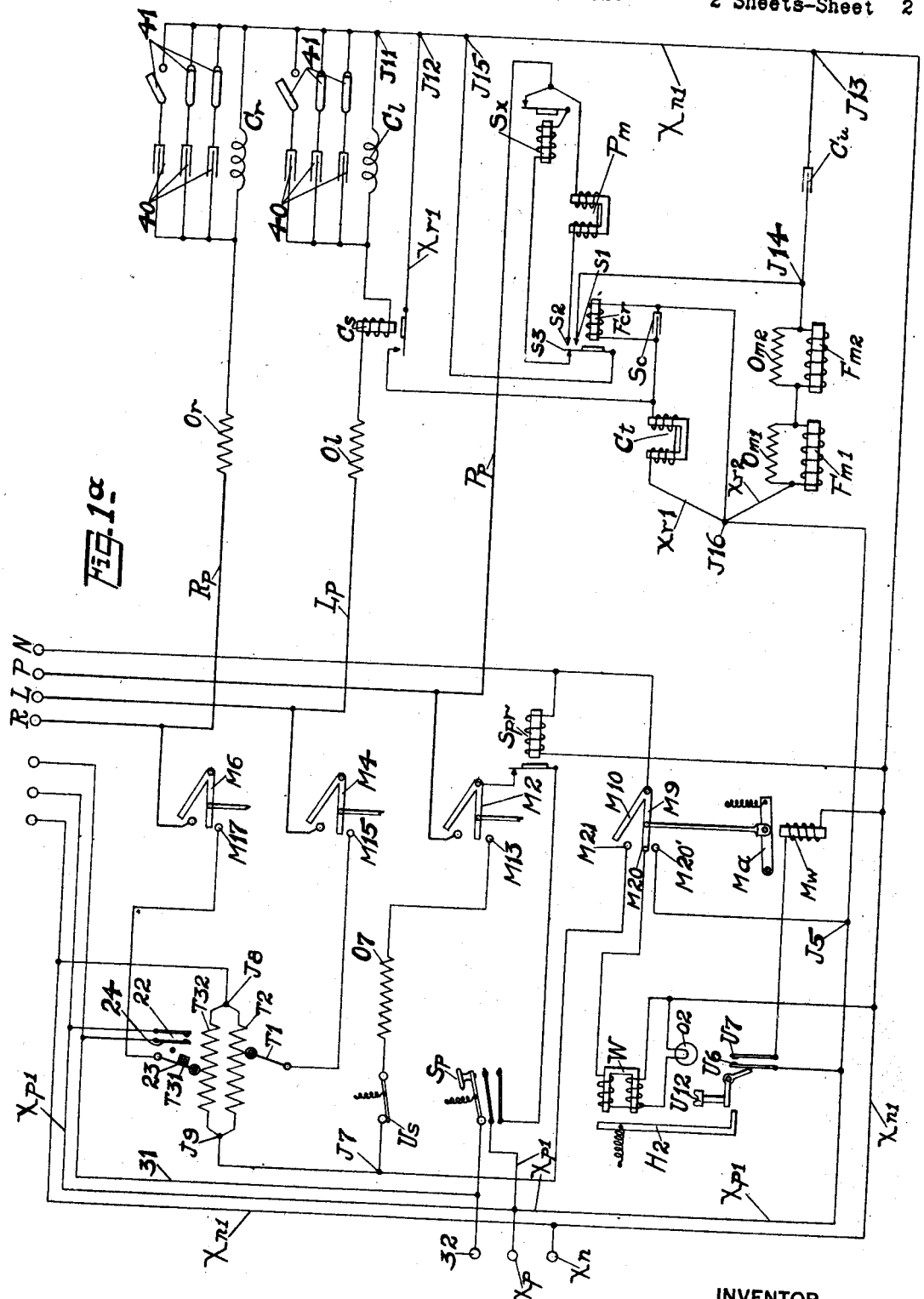

Patented Sept. 10, 1929.

1,728,022

UNITED STATES PATENT OFFICE.

ARLEIGH N. VAN NOSTRAND, OF FLUSHING, NEW YORK, ASSIGNOR TO TELAUTOGRAPH CORPORATION, OF NEW YORK, N. Y., A CORPORATION OF VIRGINIA.

TELAUTOGRAPH SYSTEM.

Application filed September 29, 1928. Serial No. 309,271.

This invention relates to improvements in telautograph systems and more particularly to a telautograph system of the variable strength direct current type which is to be energized from an alternating current source.

It has been common heretofore where a telautograph system utilizing direct current is employed in localities supplied only with alternating current to provide a motor generator set to utilize the alternating current and develop a direct current which is then supplied to the terminals of the telautograph apparatus. In such a system it is necessary in practice to keep the motor generator set running at times where the telautograph apparatus is not in use for the transmission of messages, because of the loss of time in starting a motor generator and getting it up to the normal speed. For this reason there is considerable expense in operation due to use of current by the motor generator set when it is running idly.

It is the object of the present invention to provide a telautograph system which, while transmitting by means of direct current, will utilize alternating current from a power line supplying it, and will permit the use of starting means connected with the telautograph transmitter so that the means for supplying direct current from an alternating source is immediately put into action and stopped with the starting and stopping of the telautograph transmitter and without any special additional action by the operator. Furthermore, by the present invention the current supplied to the transmitter and receiver may be a composite current which may be considered as comprising a direct current of the strength necessary for the operation of a telautograph apparatus and an alternating current of relatively low amplitude and such frequency as will cause a trembling action or slight vibration of the bucket coils of the receiver and thereby of the receiver pen, as is customary in such apparatus.

With these general objects in view the invention broadly considered consists in a telautograph system of the variable strength direct current type with a rectifier of the rectifying valve type arranged to receive alternating current and deliver its so-clled direct current to the transmitter, the latter being provided with means whereby upon putting the transmitter into condition for operation, the rectifier will be put in action to supply the requisite direct current to the transmitter, and upon putting the transmitter out of condition for operation the rectifier will be put out of action, this control of the rectifier being done without requiring any normal act on the part of the operator additional to his acts in controlling the transmitter in the usual way.

Thermionic valves as rectifiers of alternating current have long been known, but as the valves themselves do not give a true direct current from an alternating current but a fluctuating or pulsating current, which is disadvantageous when a direct current is needed, it has heretofore been considered necessary to employ a plurality of valves and to send the output current from the valves through filtering or absorbing circuits, which would absorb or dampen out the fluctuations as much as possible in order that the current finally delivered from the rectifier will be substantially smooth direct current. In other words, the usual themionic rectifier is not an ideal source of true direct current.

By the present invention this deficiency or defect of the thermionic valve rectifier is converted into an advantage, for the reason that by employing such a rectifier with a telautograph apparatus of the variable strength direct current type it is possible to omit the means heretofore specially provided for causing a vibration of the receiver bucket coils, and furthermore it is unnecessary to provide means for so complete an absorption or elimination of the pulsatory portion of the current delivered by the thermionic valves of the rectifier because a current of this kind will be ideal for operating a telautograph receiver if the frequency and amplitude of the pulsations are correctly chosen. This is because a pulsatory direct current is equivalent to the sum of an alternating current and a true direct current. The latter serves for the usual operation of the telautograph apparatus and the alternating current if of a proper frequency serves to produce the requisite trembling or vibratory action of the bucket coils to overcome static friction. By the present invention the strength of the alternating current component of the current passing through the bucket coils may be controlled by the adjustment of certain shunts for alternating current, as more fully explained hereinafter.

However, as rectifiers employing thermionic valves are readily injured by strong inductive discharges, and as the normal operation of a telautograph system will give rise to such discharges at frequent intervals, the present invention comprises means for protecting the rectifier from the injurious effects of inductive discharges from the telautograph apparatus.

A telautograph system embodying the present invention is illustrated in the drawings, in which Figs. 1 and 1a together constitute a diagrammatic view of a variable strength direct current telautograph transmitter and receiver in combination with a rectifier of the thermionic valve type, it being understood that the line terminals marked 32, $Xp$ and $Xn$ in Fig. 1a are the same terminals correspondingly marked in Fig. 1.

Referring to the drawings, and more particularly to Fig. 1a, the essential elements of a telautograph transmitter are shown diagrammatically at the left hand side of Fig. 1a while the essential elements of a telautograph receiver are shown at the right hand side of the same figure. In the transmitter, the usual telautograph rheostats are indicated at T2 and T32, the arms carrying the contact rollers are indicated at T1 and T31, the platen switch at $Us$, the parts of the master switch are designated by various reference letters and numbers preceded by M, for example, $Mw$, $Ma$, M9, and so on. The unison switch parts are indicated at U12, U6 and U7, the parts of the magnetic locking mechanism for locking out said switch at W and H2. These parts need not be described in detail, as they are fully disclosed in my prior Patent No. 1,623,220 granted April 5, 1927.

At $Sp$ is indicated a signalling key and at $Spr$ a magnetic cut-out for opening the circuit of said signalling key, to render it inoperative, the cut-out being controlled from a distant station, as will be more fully explained hereinafter.

The receiver parts include the bucket coil $Cr$ for the right hand writing line, the bucket coil $Cl$ for the left hand writing line, the field magnet windings $Fm1$, $Fm2$, $Om1$ and $Om2$, the paper shifter magnet windings $Ct$, the pen lifter windings $Sx$, and the field control relay windings $Fcr$. Also a condenser for short circuiting the oscillatory discharge from the field magnet coils is indicated at $Cu$ and a condenser for short circuiting the oscillatory discharges from both the field control relay windings and the paper shifter windings $Ct$ is indicated at $Sc$. Resistances for balancing the total resistances of the writing lines are indicated at $Or$ and $Ol$ respectively. At the transmitter end of the drawing a resistance is indicated at $O7$ the purpose of which is to adjust the resistance of the pen lifter circuit and thereby determine the current which flows to the pen lifter at the receiver.

The apparatus diagrammatically illustrated in Fig. 1a is intended to be connected with similar apparatus at a distant station. The line wires to the distant station are assumed to lead from the terminals marked R, L, P and N, R indicating the right hand writing line terminal, L the left hand writing terminal, P the pen lifter line terminal and N the locking line terminal.

In said Fig. 1a the lines $Xp1$, $Xn1$ and 31 indicate power lines which supply current for the system as will be more fully explained in connection with Fig. 1.

Referring to Fig. 1 two sets of thermionic valves are illustrated, each set comprising a plurality of such valves arranged in series. In the present example two such thermionic valves are employed in each set, one set comprising the two valves indicated at 9 and 10, respectively, while the other set comprises the two valves 11 and 12, respectively. Each valve comprises the usual two-electrode tube having a body arranged to give off electrons when heated, (such body usually being a filament), a plate electrode or anode, and an exhausted receiver in which the filament and the plate are contained.

In the embodiment of the invention illustrated in the drawings, each pair of valves constituting a set is included in a branch circuit, the branches being in parallel and arranged to be energized by the main secondary winding 5 of a transformer 1. This secondary has end terminals 6 and 7 and a center tap 8. As will be noted from the drawings the sets of thermionic valves are oppositely arranged, so that when one set is acting to prevent or reduce the flow of current, the other set allows it to flow, and vice versa. In the embodiment of the invention shown in the drawing the end terminal 6 of the main secondary 5 of the transformer is connected to the filament of the valve 10, and the end terminal 7 of said secondary is connected to the filament of the valve 11. The plate of the valve 13 is connected to a conductor 35 and the plate of the valve 12 to a conductor 36. These conductors are joined at 37 to the negative power line $Xn$.

The filaments of the valves must be heated in some suitable way by an electric current. In the example illustrated each filament has its own secondary 15, these being secondary windings of the transformer 1.

To the central tap of the main secondary of the transformer is connected the positive power line $Xp$, a suitable iron core choke coil 16, shunted by a resistance 28 being included in the circuit of the power line for a purpose hereinafter explained.

There is also included in the positive power line the winding 25 of a relay, the purpose of which will be explained hereinafter.

The primary winding 2 of the transformer 1 is arranged to be energized from a suitable source of alternating current not shown, which may be connected to the line terminals 3 and 4. The primary 2 has one end connected to terminal 3 by the conductor 34. The terminal 4 may be put in communication with the other end of the primary 2 over conductors 26 and 27 when said conductors are connected with each other at the contacts of either of the two relays whose windings are indicated at 17 and 25, respectively. The two sets of relay contacts are arranged in parallel with each other, as will be clear from the drawings.

The relay winding 17 is included in a starting circuit arranged to be controlled by contacts 22, 24, Fig. 1ª, this circuit including the conductor 31, terminal 32, conductor 33, secondary winding 18 of a starting transformer 19, relay winding 17, conductor 30 and a part of the positive power line $Xp$, $Xp1$. The primary winding 20 of the starting transformer 19 is included in a shunt branch of the alternating current circuit, as will be clear from the drawings.

The contacts 22 and 24 are located in close proximity to one of the arms controlled by the stylus of the transmitter. In the best embodiment the right hand arm is employed to close the said contact points. In Fig. 1ª the arm T31 is shown as provided with a bumper 23 of insulating material, which, as the arm 23 moves toward the unison position, will close the contact devices 22 and 24 and thereby close the starting circuit. Since the primary 20 of the starting transformer 19 is presumably included in the alternating current line, the secondary 18 will supply current to the starting circuit as soon as the contact devices 22 and 24 close the circuit. Thereby the winding 17 of the starting relay is energized and the contacts of this relay are closed. This action closes the circuit through the primary 2 of the power transformer 1, thereby energizing the secondaries 15 which furnish electric energy for heating filaments of the thermionic valves. Also the main secondary 5 of the power transformer is given a potential so that when the power circuit over the conductors $Xp$ and $Xn$ is closed at the contacts U6, U7, by pressing down the key U12, Fig. 1ª, of the unison switch, current flows over the power circuit.

Thereupon the relay winding 25 is energized and closes its own relay contacts, thereby closing the alternating current circuit and maintaining the said circuit closed even if the winding 17 of the starting relay is deenergized, which occurs as soon as the operator swings his stylus from the unison position to write a message. This is because the movement by the stylus of the operating arm T31 away from the unison position allows the contact devices 22 and 24 to separate and thereby open the starting circuit.

So long as the power circuit is closed the alternating current circuit is held closed by the holding relay having the windings 25 included in the power circuit, and the transformer 1 supplies energy to this power circuit. When the operator has ceased transmitting and opens his unison switch the power circuit is opened, thereby deenergizing the winding 25 of the holding relay. This opens the alternating current circuit at the contacts of the holding relay. However, when the operator moves his stylus to the unison position to open the unison switch the arm T31 is correspondingly brought into position to close the contacts 22 and 24, thereby closing the starting circuit and energizing the windings 17 of the starting relay so that the alternating current circuit is closed at the contacts of the starting relay although opened at the contacts of the holding relay. If, therefore, after opening the unison switch, the operator moves his stylus away from the unison position before putting it down, he thereby moves the arm T31 away from the contacts 22 and 24 and allows them to open, which by opening the starting circuit, opens the contacts of the starting relay and thereby opens the alternating current circuit. In order to insure this movement of the stylus from the unison position independently of the operator, the contact devices 22 and 24 may be in the form of contact springs, the one 24 which is engaged by the block 23 on the arm T31 having sufficient resiliency to move the arm T31 and the stylus arm away from the unison position so soon as the stylus is released from the hand of the operator, simultaneously opening the starting circuit.

While in the present application the contact devices 22 and 24 are illustrated diagrammatically as ordinary contact springs each fixed at one end and provided with a contact point at the other end, I have devised a special circuit closing device which has many advantages for use in connection with the telautograph apparatus shown and described in this present application. This special circuit closing device is fully described and claimed in another application, Ser. No. 309,270, filed by me concurrently with this application.

In order to prevent the starting switch from offering mechanical resistance to the motion of the stylus when it is being employed for writing, the unison point is located a little further to the left than the standard unison position, say, for example, ¼″.

The two sets of rectifying tubes in connection with the transformer are arranged to receive alternating current and deliver an unidirectional pulsatory current in the output circuit which includes the power wires $X_p$ and $X_n$. Such a current as would be delivered by the valves alone is too irregular for use in the writing line. Therefore, suitable means is provided for smoothing out some but not all the irregularities of the output current. While this can be done in various ways, in the present embodiment of the invention there is provided a reactance, or choke coil 16 in the positive power line $X_p$, the reactance of this coil being sufficient to give in the power lines a current which may be considered as the resultant of a true direct current and an alternating current of relatively slight amplitude. In other words, the final output current, which is employed in the telautograph writing lines may be considered as a direct current with a slight ripple, the frequency of the ripple developed from an ordinary commercial alternating current being entirely satisfactory for giving the bucket coils the slight vibration or trembling action required in a telautograph receiver.

By employing the output current from a thermionic valve apparatus and a choke coil, a considerable simplification of the telautograph apparatus itself results because it becomes unnecessary to provide the receiver with means for supplying a vibratory current to the field magnets which coact with the bucket coils, or to provide a special device at the transmitter for developing a special vibratory current and sending it over the writing lines at the proper time.

It is apparent that, each time the unison contact is broken, there results a high voltage inductive discharge both from the telautograph circuit and from the choke coil 16 and this discharge tends to cause arcing across the anode 13 and filament 14 of the rectifier valves 9—12. There is provided means to prevent this injurious action. This may be accomplished, for example, by absorbing the discharge before it reaches the valves. Although capable of various constructions, in that here shown as an example, bridged across the choke coil 16 is a ple, bridged across the choke coil 16 is a shunt circuit including a non-inductive high resistance 28 in the neighborhood of 800 ohms through which the coil discharges when the writing circuit is broken; while bridged across the D. C. supply line to absorb the discharge from the field magnets $F_m1$, $F_m2$, is a non-inductive high resistance 29 of approximately 1200 ohms.

For improving the operation of telautograph systems of this type it is desirable that the load, except for the varying writing line currents, be kept as nearly constant as possible. The pen lifter circuit as provided in telautograph systems heretofore known consumes a comparatively large amount of current when operating. The effect of a high pen lifter current consumption on the rectifier current supply circuit in systems of the type herein described may be stated as follows. The breaking of the pen lifter circuit by the depression of the pen lifter circuit by the depression of the platen to open underplaten contact $U_s$ (the well known pen lifter operation) relieves the losses in the choke coils and thermionic valves in the rectifier circuit with the result that the voltage of the supply is increased.

It has been found that such sudden increase in voltage tends to cause when writing a hook on the top of straight line characters. For example, the Figure "1" when written under such conditions would appear as "7". Means have been provided for eliminating such conditions and to this end the pen lifter magnet windings $P_m$ are wound to a much higher resistance than on other types of telautographs while the resistance $O_r$ included in the P line at the transmitter is also given a comparatively high value.

It is apparent from the drawing that the circuit for the signal buzzer $S_x$ is broken through the back contact of relay $F_{cr}$ and that the circuit for pen lifter magnets $P_m$ are closed through the front contact of this relay. It is thus evident therefore that the P line supplies current to only one of these devices at any instant with the result that the instantaneous load on this line is further reduced.

The operation of this device is as follows:

The operator at the transmitting station desiring to communicate with the receiving station moves the stylus to unison position, closing the starting contacts 22, 24. Thereupon a circuit is completed from one side of the secondary winding 18 of the transformer 19, winding of low voltage A. C. starting relay 17, conductor 30, terminal post Xp (Fig. 1ª), supply line Xp1, starting contacts 22, 24, conductor 31, terminal post 32, starting wire 33 to the other side of the secondary winding 18 of transformer 19. The starting relay 17 is energized in this circuit, thereupon completing a circuit through its contacts for energizing the primary winding 2 of the transformer 1. This circuit may be traced from one side 3 of the A. C. source over conductor 34, winding 2, contacts of relay 17 back to the A. C. source at terminal 4. Upon the energization of this transformer, rectified D. C. is supplied to the power lines.

The positive line extends from the central tap 8 of the main secondary winding, through choke coil 16 (and non-inductive resistance 28 in parallel), winding of holding relay 25 to the positive D. C. line Xp1 at post Xp. The negative D. C. line is traceable from the ends, 6, 7, of secondary winding 5 through rectifier valves 10, 9 and conductor 35 on one side, joining at the junction point 37, thence over conductor 38 to the negative D. C. line Xn1 at post Xn. The contacts 22, 24 when made, it will be remembered, are temporary, being broken upon the movement of the stylus from unison position. For this reason, the transformer 1 would become de-energized if it were not for the energization of the holding relay 25, the contacts of which complete a parallel holding circuit for the transformer winding.

This holding relay 25 is energized as long as the writing system is in use since the main line of the D. C. source passes through its winding. Upon the completion of communication, the operator again closes contacts 22 by motion communicated from the stylus, again operating the relay 17, whereupon the energizing circuit for the primary winding of the transformer is transferred to the contacts of the starting relay 17, and, after the unison button U12 is released, the holding relay 25 de-energizes and the starting relay 17 carries the full load through its contacts. Then, as the stylus is released, the starting relay 17 thereupon de-energizes, in turn, breaking the circuit through the primary winding 2 of the transformer 1. It is thus seen that the main transformer primary circuit is always made and broken by the A. C. starting relay, the D. C. holding relay 25 only holding the primary energized during the writing.

The audible signal or buzzer Sx which may be operated at the beginning or after the completion of a message, may also be arranged to be energized from the rectifier. It is, therefore, desirable that the rectifier be started upon the pushing of the signal push buttons Sp. The closing of the push button Sp completes a circuit for the starting relay 17 which extends from one side of the secondary winding 18 of the transformer 19 through the winding of the starting relay 17, conductor 30, post Xp, D. C. line Xp1, middle and upper contacts of the push button Sp which are closed first upon the depression of the button, terminal post 32, over conductor 33 to the other side of the secondary winding 18 of the transformer 19.

Thereupon the rectifier functions in the same manner as above described. The circuit for the signal buzzer is then traceable as before described, over the pen lifter circuit, the middle and lower contacts of the button Sp completing the circuit. It is to be noted that the positive D. C. line 30 constitutes a common wire for both D. C. supply and for the A. C. starting circuit, thus eliminating one wire. This combination permits energizing the starting circuit and the buzzer circuit by the same key, thus eliminating an extra contact.

It will be remembered that in the instruments of all telautograph systems there is present a certain amount of static friction which it has been the practice to overcome by the provision of a shaker buzzer. By the present invention, I am able to eliminate this shaker buzzer. This may be accomplished by taking advantage of the fact that the rectifier device herein shown as an example, produces an imperfectly rectified current. In other words, there is present in the rectified current a small A. C. component which passes through the field coils and the buckets. As a result, a slight vibration of the buckets occurs which, while sufficient to overcome the static friction, is insufficient to affect the steadiness of the writing pen. The present invention includes means for controlling the extent of the vibration of the moving parts to overcome static friction. This may be accomplished by controlling the amount of A. C. passing through the bucket coils. In structures embodying the invention to what is now considered the best advantage, this control will be obtained by the provision of shunt paths for the A. C. Although capable of various constructions, in that here shown as an example, a plurality of fixed condensers 40 are arranged in individual shunt circuits around each of the bucket coils. In order to include or exclude one or the other of the fixed condensers in the circuit, as conditions may necessitate, provision is made to open and close these shunt circuits. To this end, single pole switches 41 are located in each circuit. Upon installation the amount of A. C. shunted and, therefore, the amount passing through the bucket coils, can be determined, and the proper switches permanently closed, with the result that the vibration of the moving parts can be nicely regulated. If it is found after service that friction has increased, the connections may then be altered to overcome this increased friction.

It is to be noted also that, by by-passing some of the A. C. around the bucket coil windings, as herein described, a purer D. C. is secured for their operation, so that the resulting written characters are much smoother in outline.

The description of the operation of the telautograph apparatus in writing, signalling and locking is omitted as it is known to those skilled in the art from my prior Patent No. 1,623,220 hereinbefore referred to.

The details of the left line relay and field control relay, as well as the arrangement of the receiver circuits containing them are more fully described in another application, Ser. No. 309,272, filed by me of even date herewith.

While the rectifying means herein before specifically described is of the thermionic valve type, it is to be understood that other rectifiers working on the valve principle, for example the so-called copper oxide and copper sulphide rectifiers may be employed instead of the thermionic rectifiers.

What is claimed is:

1. In a telautograph system, a writing circuit containing receiver bucket coils a source of alternating current, and valve rectifying means arranged to supply direct current and a bucket coil trembler current from the alternating current source to the writing circuit.

2. In a telautograph system, a writing circuit containing receiver bucket coils, a source of alternating current, valve rectifying means arranged to supply direct current and a bucket coil trembler current, from the alternating source to the writing circuit, and means for adjusting the amplitude of said trembler current supplied to said bucket coils.

3. In a telautograph system, a writing circuit, a source of alternating current, a valve rectifying means, arranged to supply a rectified current from said source of alternating current to said writing circuit, manually operated means for varying the current in the writing circuit, and means actuated by said writing current varying means for starting and stopping the rectifying means.

4. In a telautograph system, a source of alternating current, rectifying means, a writing circuit supplied by said rectifying means, a signal means, and means for operating said rectifying means upon operation of said signal means.

5. In a telautograph system, a source of alternating current, a plurality of rectifier valves across said source, a writing circuit supplied by said rectifying means, signal means, and means controlled by said signal means for operating said rectifying means upon operation of said signal means.

6. In a telautograph system, a writing circuit having a positive line, a source of alternating current, rectifying means arranged to supply a rectified current to the writing circuit from the alternating current source, control means for the rectifying means, and an alternating current circuit for the control means superimposed in part upon the positive direct current line.

7. In a telautograph system, a writing line, bucket coils therein, a source of alternating current, rectifying means arranged to supply a rectified current from said source to the writing line, said rectified current having a direct current component and an alternating current component, and a by-pass condenser in shunt with the bucket coils, to by-pass part of the said alternating current component.

8. In a telautograph system, a writing circuit, a unison switch arranged to cause the closing of the writing circuit, a source of alternating current, rectifying means between the source and the writing circuit, and controlling means to render the rectifying means operative only when said unison switch is operated.

9. In a telautograph system, a writing circuit, a unison switch arranged to cause the closing of the writing circuit, a source of alternating current, rectifying means between the source and the writing circuit, a controlling circuit including a relay for controlling the rectifying means, and means for closing the controlling circuit upon operation of the unison switch.

10. In a telautograph system, a writing line, a source of alternating current, a transformer, a thermionic rectifier arranged to supply a rectified current from the transformer to the writing line, relay having its windings in circuit between the rectifier and the writing line, and having contacts arranged to control the connection of the transformer to the alternating source, a controlling circuit energized from the alternating source, a relay having its windings in said controlling circuit and having contacts arranged to control the connection of the transformer to the alternating current source, means for regulating the supply of current from the rectifier to the writing line, and means actuated by said regulating means for closing and opening said controlling circuit.

11. In a telautographic system, a writing circuit, a contact lever for completing the writing circuit, a source of alternating current, rectifying means between the source and the writing circuit, a controlling circuit for the rectifying means including a relay and a contact closed upon operation of the contact lever, and an operating circuit completed at the contacts of said relay, said operating circuit including the primary winding of a transformer, the secondary of which constitutes a part of the rectifying means.

12. In a telautographic system, a writing circuit, a contact lever for completing the writing circuit, a source of alternating current, rectifying means between the source and the writing circuit, a controlling circuit for the rectifying means including a relay and a contact closed upon operation of the contact lever, a second control circuit for the rectifying means in parallel with the first control circuit and operable to maintain the rectifying means operated.

13. In a telautograph system, a source of alternating current, a plurality of rectifying tubes connected to the source, a direct current load circuit supplied by the rectifying tubes to control the connection of the tubes to the alternating current source, means to control the direct current load circuit, and common means for operating first said tube connection control means and then said direct current load circuit control means.

14. In a telautographic system, a source of alternating current, rectifying means, a direct current communicating circuit, controlling means for the rectifying means, a control device operated at the beginning and end of communication to energize the control means, and holding means for the rectifying means operated upon the completion of the load circuit.

15. In a telautograph system of the variable current type, the combination, with the writing circuits containing bucket coils, and a circuit including field magnet coils for producing a magnetic field in which said bucket coils are located, of a rectifier arranged to rectify alternating current from a suitable source and to deliver a rectified current for energizing the writing lines, said rectified current comprising a direct current and an alternating current, the latter serving to vibrate the bucket coils.

16. In a telautograph system of the variable current type, the combination, with the writing circuits containing bucket coils and a circuit including field magnet coils for producing a magnetic field in which said bucket coils are located, of a rectifier for rectifying alternating current from a suitable source and to deliver a rectified current, said rectifier including thermionic valves and inductance choking devices, a pen lifter circuit and means for reducing the current consumption of said circuit.

17. In a telautograph system of the variable current type, the combination, with the writing circuits containing bucket coils and a circuit including field magnet coils for producing a magnetic field in which said bucket coils are located, of a rectifier for rectifying alternating current from a suitable source and to deliver a rectified current, said rectifier including thermionic valves and inductance choking devices, a pen lifter circuit and means for reducing the current consumption thereof comprising a high resistance pen lifter magnet winding and a high resistance non-inductive winding in series in said circuit.

18. In a telautograph system of the variable current type, the combination, with the writing circuits containing bucket coils and a circuit including field magnet coils for producing a magnetic field in which said bucket coils are located, of a rectifier arranged to rectify alternating current from a suitable source and to deliver a rectified current for energizing the writing lines, a writing stylus (for varying the current in said writing lines) having a unison or starting position and means operable upon the movement of said stylus to unison position for automatically starting said rectifier.

19. In a telautograph system of the variable current type, the combination, with the writing circuits containing bucket coils and a circuit including field magnet coils for producing a magnetic field in which said bucket coils are located, of a rectifier arranged to rectify alternating current from a suitable source and to deliver a rectified current for energizing the writing lines, a starting relay for said rectifier, a circuit therefor, a normally open switch in said circuit, a writing stylus (for varying the current in said writing lines) having a unison or starting position and means operable upon the movement of said stylus to unison position for automatically closing said switch.

In testimony whereof, I have hereunto set my hand.

ARLEIGH N. VAN NOSTRAND.